United States Patent [19]
Darcie

[11] Patent Number: 6,014,479
[45] Date of Patent: Jan. 11, 2000

[54] HIGH CHANNEL DENSITY WAVELENGTH DIVISION MULTIPLEX (WDM) OPTICAL TRANSMISSION SYSTEM AND METHOD WITH NEGLIGIBLE FOUR-WAVE MIXING (FWM) PENALTY

[75] Inventor: Janet Marie Darcie, Middletown, N.J.

[73] Assignee: Tyco Submarine Systems Ltd.

[21] Appl. No.: 08/728,653

[22] Filed: Oct. 10, 1996

[51] Int. Cl.[7] .............................. G02B 6/28; H01S 3/10; H04J 14/00

[52] U.S. Cl. ................ 385/24; 385/123; 385/1; 372/9; 359/115; 359/124; 359/140

[58] Field of Search ................ 385/24, 15, 123, 385/141, 147, 1, 2; 372/9, 18; 359/115, 124, 135, 140, 153, 161, 173, 188

[56] References Cited

U.S. PATENT DOCUMENTS

| | | | |
|---|---|---|---|
| 4,261,639 | 4/1981 | Kogelnik et al. | 385/123 X |
| 5,035,481 | 7/1991 | Mollenauer | 385/123 X |
| 5,191,631 | 3/1993 | Rosenberg | 385/123 |
| 5,218,662 | 6/1993 | Dugan | 385/123 |
| 5,261,016 | 11/1993 | Poole | 385/28 |
| 5,430,882 | 7/1995 | Shigematsu et al. | 385/123 |
| 5,473,719 | 12/1995 | Stone | 385/123 |
| 5,524,144 | 6/1996 | Suzuki | 359/176 |
| 5,532,868 | 7/1996 | Gnauck et al. | 359/332 |
| 5,546,210 | 8/1996 | Chraplyvy et al. | 359/124 |
| 5,559,920 | 9/1996 | Chraplyvy et al. | 385/123 |
| 5,596,448 | 1/1997 | Onaka et al. | 359/341 |
| 5,608,562 | 3/1997 | Delavaux et al. | 359/161 |
| 5,636,046 | 6/1997 | Ishikawa et al. | 359/161 |
| 5,642,215 | 6/1997 | Suzuki et al. | 359/161 |

*Primary Examiner*—Brian Healy

[57] ABSTRACT

A source/transmission fiber strategy results in a WDM system with negligible FWM penalty even for closely-spaced channels. The combined performance of a source which provides chirped wavelength pulses with a precise synchronism, along with a transmission fiber dispersion map avoids pulse overlap.

12 Claims, 2 Drawing Sheets

HIGH CHANNEL DENSITY WAVELENGTH DIVISION MULTIPLEX (WDM) OPTICAL TRANSMISSION SYSTEM AND METHOD WITH NEGLIGIBLE FOUR-WAVE MIXING (FWM) PENALTY

FIELD OF THE INVENTION

The present invention relates to optical transmission systems. More specifically, the present invention relates to the combination of a laser source with an optical fiber that allows minimal the wavelength separation between channels while simultaneously minimizing four wave mixing noise.

BACKGROUND

Wavelength division multiplex (WDM) networks offer high capacities and facilitate a wide variety of architectures. The finite system optical bandwidth and the effects of dispersion, however, restrict the overall number of channels carrying data and encourage small wavelength separation between the channels. Unfortunately, because the optical transmission fiber of an optical transmission system has a non-linear refractive index, four-wave mixing (FWM) penalties, also known as four-photon mixing penalties, can occur. As the wavelength separation between channels in a WDM network is designed to be smaller, the severity of FWM penalties associated with closely spaced channels correspondingly increases. This effect restricts the allowable wavelength separation of channels carrying data and, therefore, also limits the number of allowable channels within a WDM network.

Four-wave mixing occurs when two or more optical waves create a beat frequency whose oscillation modulates the refractive index of the optical fiber. This process generates sidebands that appear as noise, or intermodulation products (IMPs), in the neighboring channels. The magnitude of the noise for a given fiber is a function of the wavelength separation between interacting channels, the power in each channel, and the phase matching efficiency.

Several methods have been suggested to reduce or minimize FWM noise associated with closely located channels. For example, the phase matching, which is related to the magnitude of the FWM noise, can be decreased through the use of a high dispersion fiber (e.g., the commercially available fiber known as 1D). Although high dispersion within a fiber would decrease the phase matching and correspondingly decrease the FWM noise, high dispersion within a fiber imposes additional penalties such as pulse distortion over long distances.

Alternatively, because FWM noise is a function of the signal power in each channel, reducing the signal power or field amplitude for each channel has also been suggested. Because the power of the IMP generated by waves i, j, and k ($P_{ijk}$) is proportional to the product of the individual component powers, $P_iP_jP_k$, FWM noise can be greatly reduced by reducing field amplitudes. The signal power per channel, however, can only be reduced to a certain minimum level as dictated by the signal-to-noise ratio (SNR) limit for the system; if the signal power per channel is decreased below the minimal level, the signal power compared to the noise power may not be sufficient to maintain an acceptable low bit error rate (BER). For traditional fiber systems with non-return-to-zero (NRZ) modulation and optical amplification, the signal power for each channel typically cannot be made sufficiently low to avoid FWM penalties for low channel spacing. Thus, traditional fiber systems avoid FWM noise by increasing the wavelength separation between channels.

The above design modifications all suffer the same shortcoming: as one system parameter is adjusted to reduce FWM noise, other system parameters are affected which prevent the simultaneous reduction of wavelength separation between channels and the reduction of FWM noise. Thus, current design techniques limit the allowable minimum wavelength separation between channels.

SUMMARY OF THE INVENTION

The present invention reduces or eliminates FWM noise, while allowing very small wavelength separation between the channels in a low dispersion transmission fiber. The present invention combines a chirped WDM source with a particular fiber dispersion map that prevents interchannel overlap and minimizes four-wave mixing noise throughout transmission. This design makes possible a WDM network with negligible FWM penalty even for very closely spaced channels.

The present invention comprises a laser transmitting system, a transmission fiber and a compensation fiber. The laser transmitting system generates adjacent channel return-to-zero (RZ) pulses launched sequentially in time and sequentially in wavelength over a range of wavelengths. The transmission fiber is connected to the laser transmitting system and has a known dispersion. The compensation fiber is connected to the transmission fiber and has a different known dispersion with a sign opposite to the dispersion of the transmission fiber. The extent to which the compensation fiber compensates and the length of the transmission fiber at which point the compensation fiber is connected is based on a delay between the lowest wavelength of the laser transmitting system and the highest wavelength of the laser transmitting system.

The present invention can comprise a repetitive series of transmission fibers and compensation fibers where each compensation fiber periodically compensates for the previous transmission fiber through which the signal pulses traveled.

DETAILED DESCRIPTION

Figure 1:
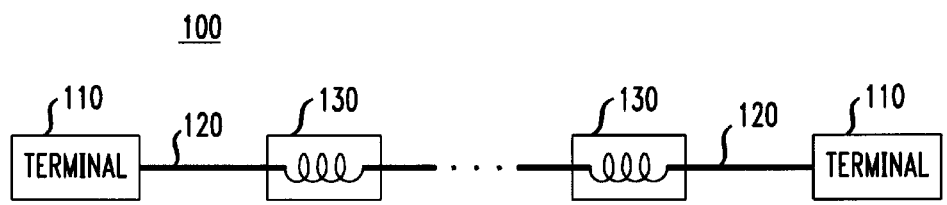
FIG. 1 illustrates an optical fiber transmission system according to an embodiment of the present invention.

FIG. 1 illustrates an optical fiber transmission system 100. Optical fiber transmission system 100 may be arranged, for example, for deployment under the ocean. Optical fiber transmission system 100 transmits wavelength division multiplex (WDM) signals from a west end terminal 110, through a series of optical fibers 120 and compensation fibers 130, to an east end terminal 110. Another set of WDM signals can be simultaneously transmitted from the east end terminal 110 to the west end terminal 110. For convenience, the following discussion will consider only signals being transmitted from the east terminal 110 to the west terminal 110, although the discussion is equally applicable for signals being transmitted from west to east. Note that optical fiber transmission system 100 can include other devices, such as repeaters, optical couplers, pump lasers, optical amplifiers, etc., which are not shown in FIG. 1.

Figure 2A:
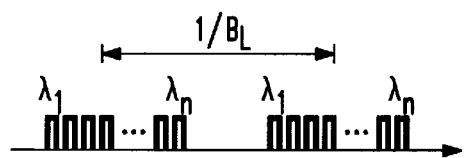
FIGS. 2A and 2B illustrate the output characteristics for the laser transmitter according to the present invention.
Figure 2B:
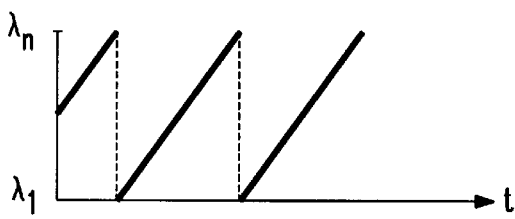

Terminal 110 includes a laser transmitter which emits WDM signals such that adjacent channel return-to-zero (RZ) pulses are launched sequentially in time and sequentially in wavelength. FIGS. 2A and 2B illustrate the output characteristics for the laser transmitter of terminal 110 necessary for the present invention. FIG. 2A shows the output pulse train with RZ pulses launched sequentially in time and in wavelength with a guard time between the pulses; FIG. 2B shows the output wavelength varying as a function of time and repeating with a period of $1/B_L$, where $B_L$ is the desired bit rate per channel. FIG. 2B is for illustrative purposes to present the relative temporal characteristics of the channels and is not intended to show details such as the return-to-zero format or actual data on the channels. Although not shown FIG. 2B, the pulse period can be separated in time with a guard time. As illustrated in FIG. 2A, each channel has a bit rate of $B_L$. Although not specified in FIGS. 2A and 2B, $\lambda_n$ can be before in time and higher in wavelength than $\lambda_1$, or alternatively, $\lambda_1$ can be before in time and higher in wavelength than $\lambda_n$. Note that any number of possible transmitter configurations or combination of transmitter configurations can produce the necessary temporal and wavelength characteristics shown in FIGS. 2A and 2B. Additionally, the individual wavelength channels can be continuous wavelength pulses or discrete wavelength pulses. Although the following discussion frequently references the temporal characteristics shown in FIG. 2B, the following discussion is equally applicable for a system with discrete wavelength pulses.

Figure 3:
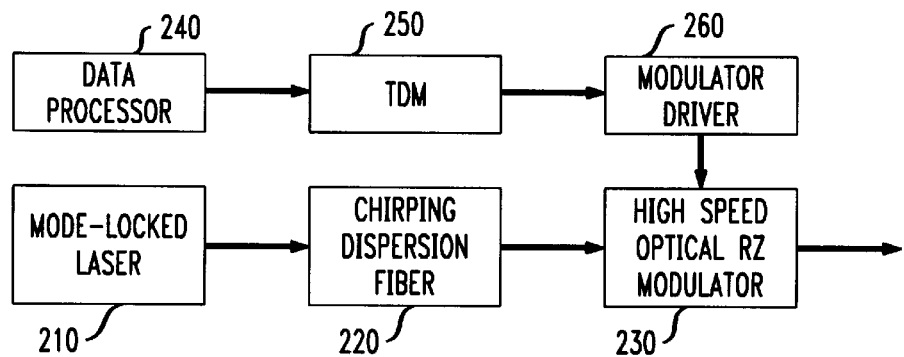
FIG. 3 illustrates a laser source configuration which produces adjacent channel return-to-zero (RZ) pulses launched sequentially in time and sequentially in wavelength.
Figure 4:
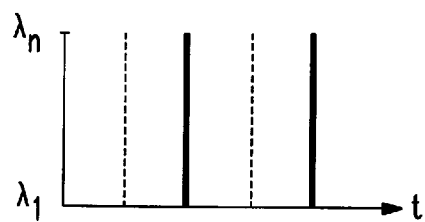
FIG. 4 illustrates the output of a mode-locking laser according to an embodiment of the present invention.

FIG. 3 illustrates an embodiment of laser source 200 that can be included in terminal 110. FIG. 3 shows a specific implementation of chirped pulse WDM (CP-WDM) transmitter that produces adjacent channel RZ pulses launched sequentially in time and sequentially in wavelength. Mode-locked laser 210 emits pulses, as shown in FIG. 4, with a repetition rate corresponding to the desired bit rate per channel, $B_L$. The wavelength range corresponds to the usable laser bandwidth, plus any filtering to flatten the spectrum and eliminate the tails or unusable spectral components. All frequency components contained in the laser bandwidth (BW) are emitted simultaneously. The pulses are then broadened in time using chirping dispersive fiber 220 which inserts a total dispersion of $D^*_s$ [ps/nm]. Chirping dispersive fiber 220 results in a temporal broadening of the pulses. The chirped pulses are then modulated by high-speed RZ modulator 230 at a rate $R_M$ such that $R_M \geq (B_L)$ (the number of desired channels).

Data processor 240 electronically sends the time multiplexed data for all the channels that are to be transmitted to time division multiplexer (TDM) 250. TDM 250 then drives high-speed RZ modulator 230 which carves out the wavelength channels from the chirped pulses while also performing individual channel modulation based on the data. Thus, the output of the source is a sequence of RZ bits at $R_M$, where each successive bit is defined by a different wavelength range (i.e., different channels), and the channel sequence is repeated at the desired rate per channel. U.S. Pat. No. 5,526,155 issued to Knox et al., on Jun. 11, 1996, and assigned to AT&T Corp. discusses this configuration for laser source 200, and is incorporated by reference herein. The west end terminal 110 which receives the transmission utilizes an optical filter or demultiplexer to select the desired channel.

Alternatively, laser source 200 can be embodied by other laser sources that also produce adjacent channel RZ pulses launched sequentially in time and sequentially in wavelength. For example, modulated pulse laser sources for each channel wavelength could be synchronized and delayed as required using fiber delay lines. The resulting output would then be a sequential launching of adjacent channels, as required.

Once the laser source of terminal 110 produces the adjacent channel RZ pulses sequential in time and wavelength and these pulses are amplitude modulated based on the data to be transmitted, these channel pulses are launched into transmission fiber 120. As illustrated in FIG. 2B, the channel pulses exiting the laser source of terminal 110 exhibit no temporal overlap. If channel pulses could remain at this level of dispersion as they travel down transmission fiber 120, there would be no possible FWM noise. If the dispersion in transmission fiber 120, $D_F$ [ps/nm-km], is non-zero, however, the temporal spread of the channel pulses will change.

Figure 5:
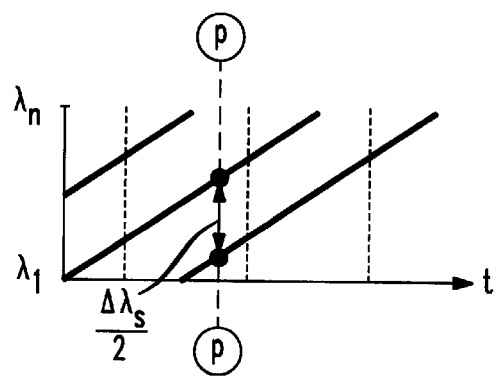
FIG. 5 illustrates the temporal characteristics of channel pulses after traveling down an optical fiber having a total dispersion of $D^*_s$.
Figure 6:
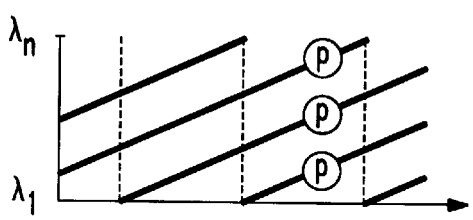
FIG. 6 illustrates the temporal characteristics of channel pulses after traveling down an optical fiber having a total dispersion of $2D^*_s$.
Figure 7:
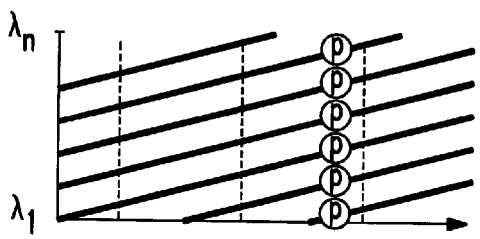
FIG. 7 illustrates the temporal characteristics of channel pulses after traveling down an optical fiber having a total dispersion of at least $3D^*_s$.

The dispersion characteristics of transmission fiber 120 are selected based on the characteristics of the laser source. For example, when laser source 200 is utilized, transmission fiber 120 has the same sign dispersion as the chirping fiber 220 of laser source 200. As the signal pulses travel down transmission fiber 120, the temporal spread of the channel pulses change in time. Once the signal pulses have traveled down transmission fiber 120 such that the total dispersion from transmission fiber 120 equals the chirping fiber dispersion, $D^*_s$, the temporal characteristics of the channels change from FIG. 2B to FIG. 5. The length of transmission fiber 120 for which the temporal characteristics or the channel pulses change to that shown in FIG. 5 is a function of chirping fiber dispersion $D^*_s$ [ps/nm] and fiber dispersion $D_f$ [ps/nm-km]. If the channel pulses are allowed to continue propagation down transmission fiber 120 for another increment of $D^*_s$, the temporal characteristics of the channel pulses change to that shown in FIG. 6. Finally, FIG. 7 shows the temporal characteristics of the channel pulses after many units of $D^*_s$.

After the channel pulses have traveled such a distance that the fiber dispersion is between the representations of FIGS. 2B and 5 ($D^*_s$, and 2 $D^*_s$ total), the pulses have spread in time such that two wavelengths can overlap at the same precise moment in time. This wavelength overlap in time can be noted in FIG. 5 where for any given time, two different propagating wavelengths overlap in position in the fiber. The peak powers, however, have decreased and so the FWM efficiency will also decrease. Moreover, the interacting waves will create IMPs that are outside the system wavelength range; the IMPs are illustrated as "P" in FIG. 5. The interacting waves are also separated by $\Delta\lambda_s/2$ as shown in FIG. 5, where $\Delta\lambda_s$ represents the overall optical bandwidth. Because a typical value of $\Delta\lambda_s$ is 20 nm, this represents a very large separation between the beating photons and, consequently, a low FWM efficiency and negligible signal depletion. Thus, the IMPs do not increase the FWM noise in the channels and only have minimal secondary effect of signal depletion in the channels.

Rather than allowing the temporal characteristics of the signal pulses to change to the point where FWM noise is no longer negligible, compensation fiber 130 having a dispersion with sign opposite of transmission fiber 120 can be connected to transmission fiber 120 at the point where the temporal characteristics of the channel pulses are that of FIG. 5. Thus, when the pulses exit compensation fiber 130, the temporal characteristics of the channel pulses return to the temporal characteristics shown in FIG. 2B. Alternatively, compensation fiber 130 can compensate more strongly to decrease the necessary frequency of compensation; in such a case the temporal characteristics of the channel pulses will be changed to a state between that shown in FIG. 5 and FIG. 4. It is likely best to avoid returning completely to the temporal characteristics shown in FIG. 4. In any case, the signal pulses can be compensated to alternate between the extremes of FIGS. 2B and 5 by propagation through transmission fiber 120 with periodic compensation by compensation fiber 130 to return to the case of FIG. 2B.

In another embodiment of the present invention, compensation fiber 130 can be arranged so that compensation of the signal pulses occurs beyond the temporal characteristics shown in FIG. 5. FIG. 6 shows that after propagation of an additional $D^*_s$ beyond the case shown in FIG. 5, the case of three overlapping wavelengths may arise. In such a case, the generated IMPs fall on the channels themselves, assuming linear dispersion and equally spaced channels, and therefore some FWM noise penalty would result. For typical source bandwidths, however, these channels are still reasonably far apart and adjacent neighboring channels will not interact. In addition, the total number of IMPs are small because only three channels are interacting at any given location. Furthermore, the spreading of pulses will decrease the power of the IMPs according to $P_{ijk} \alpha P_i P_j P_k$. Therefore, the FWM efficiency would be low and the FWM noise would be small. Furthermore, compensation fiber 130 can be arranged so that compensation occurs even after the signal pulses reach the temporal characteristics shown in FIG. 6 so long as compensation is performed before the FWM noise penalty becomes significant.

FIG. 7 illustrates the case of infrequent compensation where compensation fiber 130 is absent or is located such that the total dispersion of transmission fiber 120 is much more than $3D^*_s$. FIG. 7 illustrates the case where optical fiber transmission system 100 approaches the limit of full interaction where IMPs are present on all channels such as would be the case in the traditional strategy of separate, single-frequency sources with NRZ modulation.

Although FIGS. 2B, 5, 6 and 7 are based on linear dispersion for convenience of illustration and discussion, the present invention can also apply for non-linear dispersion. The effect of non-zero second-order dispersion would be to transform the linear representations in FIGS. 2B, 5, 6 and 7 to quadratics. For example, if the center wavelength delay is chosen as the reference (i.e., zero added delay with second-order dispersion relative to the first-order dispersion), the new endpoints of the delay curves would extend to the right or left of the linear case, depending on the sign of the second-order dispersion relative to the first-order dispersion. In practice, the nonlinear dispersion could set a maximum transmission distance achievable with the negligible penalty of two-tone IMPs unless compensation is performed over first-order and second-order dispersions.

Table 1 illustrates several possible fiber configurations, known as dispersion maps, for optical fiber transmission system 100. As an illustrative implementation of the present invention, the source dispersion shown is that required for two sample line rates, 155 Mb/s and 622 Mb/s, assuming a maximum RZ TDM rate of 10 Gb/s and an available optical bandwidth of 20 nm. The lengths of transmission fiber 120 required before compensation occurs by compensation fiber 130 were calculated using $L_f = D^*_s$ [ps/nm]/$D_f$ [ps/nm-km]. The values were estimated within a factor of two to account for uncertainties such as the potential need for a guard band between dispersed pulse streams. The values listed for Lf are estimated minima. Several transmission fiber choices are listed, along with suggested fiber types for the source chirping fiber. These values illustrate that negligible FWM penalty is possible with reasonable compensation distances. Standard compensation distances are selected as the largest allowable distances, although more frequent compensation still avoids the FWM penalty. Because the generated products fall out-of-band, the increased phase matching at such low dispersion is not of great concern. Even if the fiber dispersion is allowed to accumulate until some three-tone products are created, the FWM penalty is expected to be small, as discussed above.

It should, of course, be understood that while the present invention has been described in reference to system configurations that generate characteristics illustrated by FIG. 2B, 5, 6, and 7, alternative characteristics can be generated. For example, although not specified in FIGS. 2A, 2B and 2C, the leading channel can be higher in wavelength or lower in wavelength than the final channel. Furthermore, the channels may be continuous or discrete.

TABLE 1

Dispersion Maps for CP-WDM with Negligible FWM

| Tx Fiber [ps/nm-km] | Compensating fiber | Length of Tx. Fiber | | Comments |
| --- | --- | --- | --- | --- |
| | | 622 Mb/s | 155 Mb/s | |
| D = −1 | 5D | 42.5 km | 170 km | Total dispersion |
| −2 | 5D | 21.25 | 65 | to $D_s^*$ |
| +2 | DCF | 21.25 | 65 | 2-tone IMPs out-of |
| −.25 (DSF) | 5D | 170 | 680 | band |
| −1 | 5D | 85 | 340 | Total dispersion |
| −2 | 5D | 42.5 | 170 | to $2D_s^*$ |
| +2 | DCF | 42.5 | 170 | 3-tone products |
| −.25 | 5D | 340 | 1360 | |

What is claimed is:

1. An optical wavelength-division multiplex (WDM) system for transmitting data on closely-spaced channels on an optical fiber, comprising:

a laser transmitting system generating adjacent channel return-to-zero (RZ) pulses launched sequentially in time and sequentially in wavelength from a first wavelength to a second wavelength;

a transmission fiber connected to said laser transmitting system and having a first dispersion; and a compensation fiber connected to said transmission fiber and having a second dispersion with a sign opposite to said first dispersion, said compensation fiber compensating and having a location based on a delay between the first wavelength of said laser transmitting system and the second wavelength of said laser transmitting system.

2. The optical WDM system of claim 1, wherein said laser transmitting system includes:

a mode-locking laser;

a chirping dispersive fiber connected to said mode-locking laser; and a high speed optical modulator connected to said chirping dispersive fiber.

3. The optical WDM system of claim 1, wherein said laser transmitting system includes:

a plurality of pulse generating laser sources, each of said laser sources emitting at a different wavelength; and a plurality of fiber delay lines, each of said fiber delay lines being connected to one of said pulse generating laser sources, the length of each of said fiber delay line being based on the wavelength of said connected pulse generating laser source so that pulses of adjacent wavelengths are launched sequentially.

4. The optical WDM system of claim 1, wherein the first wavelength of said laser transmitting system is before in time and higher in wavelength than the second wavelength of said transmitting system.

5. The optical WDM system of claim 1, wherein the second wavelength of said laser transmitting system is before in time and higher in wavelength than the second wavlength of said transmitting system.

6. The optical WDM system of claim 1, wherein said laser transmitting system launches continuous wavelength pulses.

7. The optical WDM system of claim 1, wherein said laser transmitting system launches discrete wavelength pulses.

8. A method for transmitting data on closely-spaced channels on an optical fiber within an optical wavelength-division multiplex (WDM) system, comprising:

(a) generating adjacent channel return-to-zero (RZ) pulses launched sequentially in time and sequentially in wavelength from a first wavelength to a second wavelength;

(b) transmitting the pulses in a transmission fiber having a first dispersion; and (c) compensating the pulses in a compensation fiber connected to the transmission fiber and having a second dispersion with a sign opposite to said first dispersion, the compensation fiber having a location based on a delay between the first wavelength and the second wavelength.

9. The method of claim 1, wherein the first wavelength is before in time and higher in wavelength than the second wavlength.

10. The method of claim 1, wherein the second wavelength is before in time and higher in wavelength than the second wavlength.

11. The method of claim 1, wherein the launched pulses are continous wavelength pulses.

12. The method of claim 1, wherein the launched pulses are discrete wavelength pulses.

\* \* \* \* \*